United States Patent [19]

Zampa et al.

[11] Patent Number: 5,415,911
[45] Date of Patent: May 16, 1995

[54] PHOTOLUMINESCENT RETROREFLECTIVE SHEETING

[75] Inventors: Daniel E. Zampa, Cicero; Alex A. Szopinski, Des Plaines, both of Ill.

[73] Assignee: Stimsonite Corporation, Niles, Ill.

[21] Appl. No.: 15,333

[22] Filed: Feb. 9, 1993

Related U.S. Application Data

[63] Continuation-in-part of Ser. No. 821,207, Jan. 16, 1992, abandoned.

[51] Int. Cl.⁶ .................... G02B 5/122; B32B 7/12
[52] U.S. Cl. .................... 428/40; 359/529; 359/530; 428/354; 428/913
[58] Field of Search ............. 428/354, 352, 913, 40, 428/323; 359/527, 528, 529, 530

[56] References Cited

U.S. PATENT DOCUMENTS

| | | | |
|---|---|---|---|
| 2,407,680 | 9/1946 | Palmquist et al. | 359/538 |
| 3,684,348 | 8/1972 | Rowland | 359/530 |
| 3,689,346 | 9/1972 | Rowland | 156/245 |
| 3,802,944 | 4/1974 | Tung | 428/143 |
| 3,810,804 | 5/1974 | Rowland | 156/245 |
| 3,830,682 | 8/1974 | Rowland | 428/142 |
| 4,244,683 | 1/1981 | Rowland | 425/143 |
| 4,486,363 | 12/1984 | Pricone et al. | 264/1.4 |
| 4,511,210 | 4/1985 | Tung et al. | 427/163 X |
| 4,546,042 | 10/1985 | Quon | 428/378 |
| 4,567,072 | 1/1986 | Brainard et al. | 428/40 |
| 4,601,861 | 7/1986 | Pricone et al. | 264/1.6 |
| 4,618,518 | 10/1986 | Pricone et al. | 428/40 |
| 4,769,265 | 9/1988 | Coburn, Jr. | 428/40 |
| 4,801,193 | 1/1989 | Martin | 359/518 |
| 5,237,448 | 8/1993 | Spencer et al. | 119/792 |
| 5,243,457 | 9/1993 | Spencer | 119/795 |

*Primary Examiner*—Daniel R. Zirker

[57] ABSTRACT

A photoluminescent retroreflective sheeting for use in structures when a power outage occurs. Guidance systems are made from this sheeting to mark exits and escape routes as well as possible hazards and safety devices. The novel sheeting includes photoluminescent properties that glow in the dark as well as retroreflective properties that retroreflect light incident upon the same sheet such that only one sheet has to be used rather than individual sheets with separate properties.

10 Claims, 6 Drawing Sheets

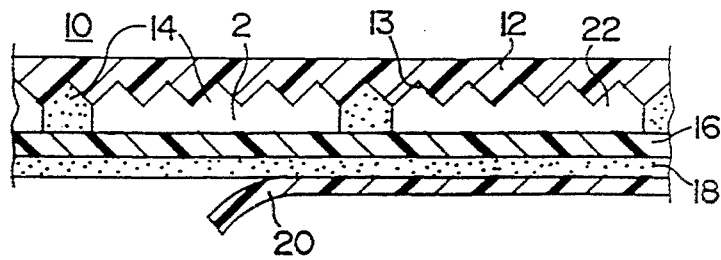
FIG. 1
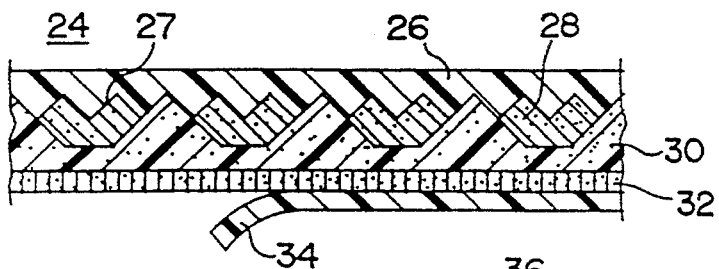
FIG. 2
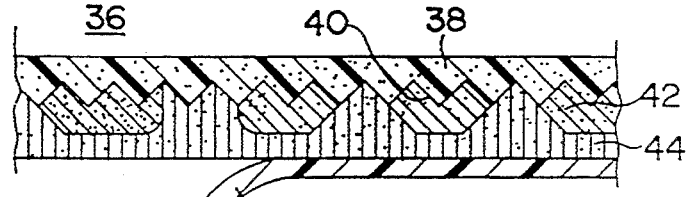
FIG. 3
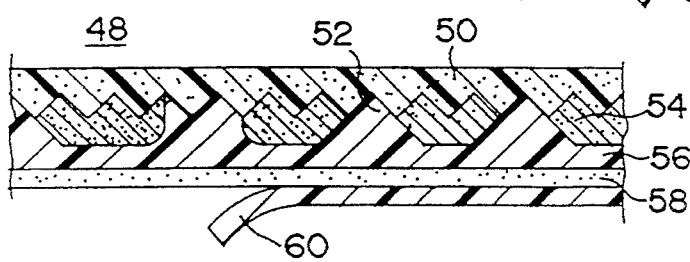
FIG. 4
FIG. 5

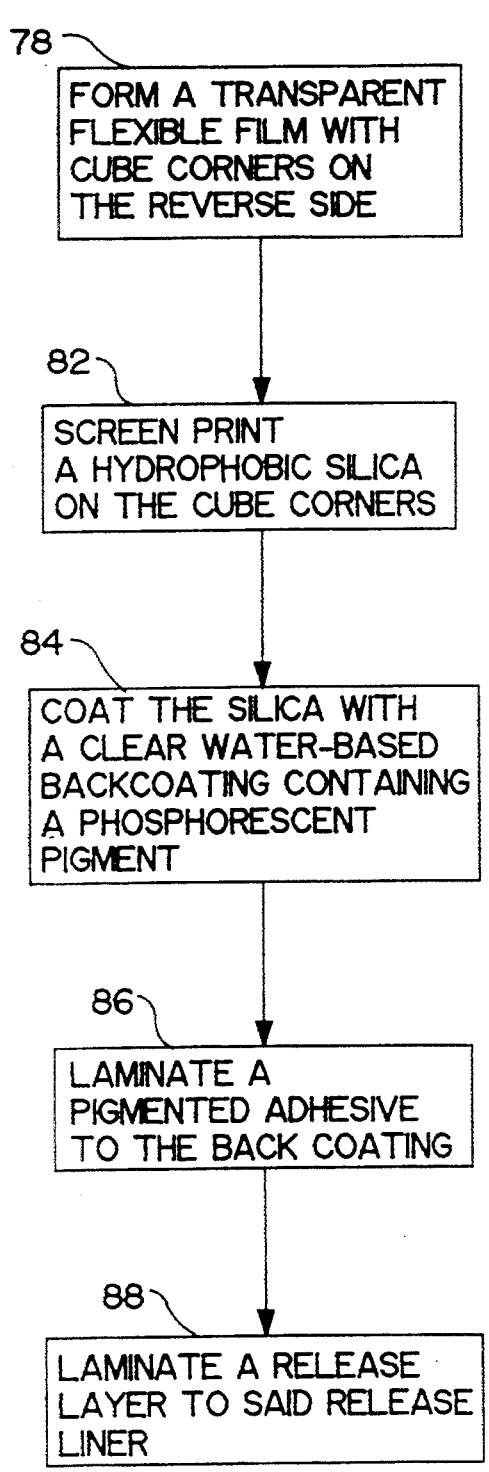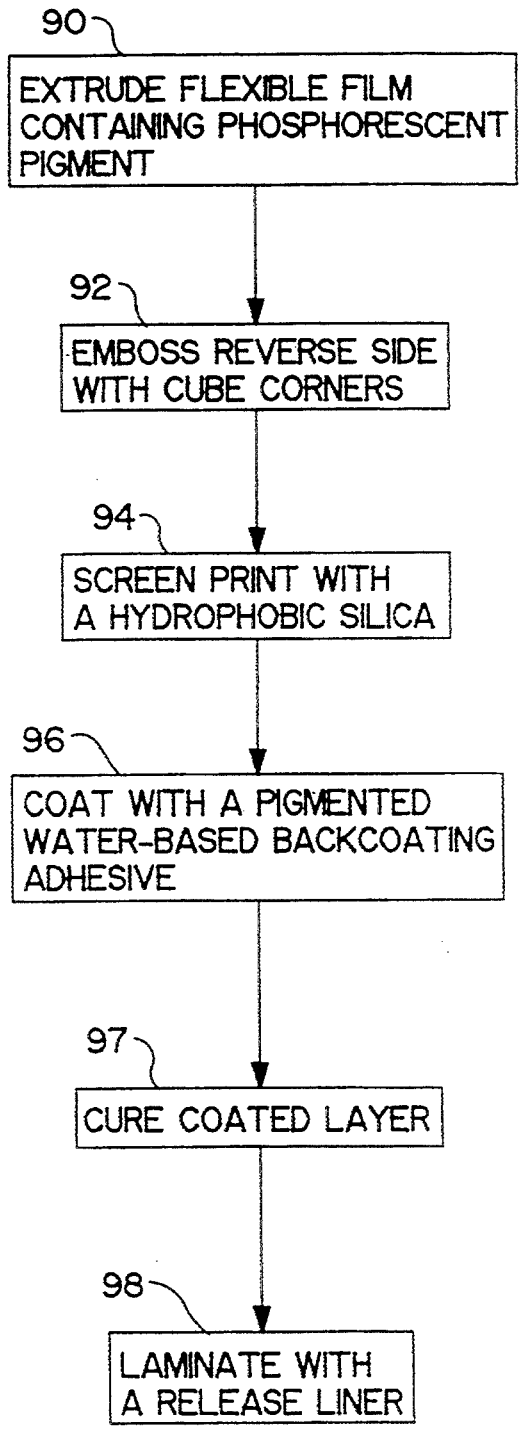
FIG. 6
FIG. 7

PHOTOLUMINESCENT RETROREFLECTIVE SHEETING

This is a continuation-in-part of U.S. Ser. No. 821,207, filed Jan. 16, 1992, now abandoned.

FIELD OF THE INVENTION

The invention relates generally to a photoluminescent retroreflective sheet material for use as a guide marker and which has particular utility in buildings when a power outage occurs. Specifically, the present invention relates to a photoluminescent retroreflective sheeting combining both photoluminescent and retroreflective properties in a single product to be used to form a marker system to help indicate exits, doorways, hazards, OSHA markings, pipe markings, high voltage areas, fire hoses and extinguishers and the like, when it is dark in the building, perhaps when caused by a power outage.

BACKGROUND OF THE INVENTION

The term "building" as used throughout this application is intended to include any structure such as an aircraft, boat or other moveable and non-moveable conventional structures.

It is well known that within buildings at night or especially when the power has been lost, it is difficult to find ones way along the necessary corridors to the building exits. Similarly, in some emergencies, the location of important fixtures such as fire alarms, extinguishers, shut-off valves and the like are difficult to find.

In the prior art, a photoluminescent material is utilized as a guide for such purposes. The luminous material is attached to doorways, hallways, and the like, so that in the event of a power outage, the photoluminescent material will glow in the dark and guide a person to an exit or along a prescribed path. Of course, it is only useful to those individuals in the building that have adjusted their eyes to the darkness. Further; the luminescence produced is significantly lost within the first 20 minutes of an "outage." This makes it virtually useless to anyone entering the building after a short period of time.

The present invention overcomes the disadvantages of the prior art by providing a single sheeting material having both photoluminescent and retroreflective properties. The sheeting should exhibit the same photoluminescent properties as the current product being used, and it has significant retroreflective properties.

Thus it is an important object of the present invention to provide a photoluminescent retroreflective sheet material that is designed to provide both photoluminescence and retroreflection of light.

It is also an object of the present invention to provide a photoluminescent retroreflective sheeting in which a phosphorescent pigment is added to the retroreflective layer.

It is a further object of the present invention to provide a photoluminescent retroreflective sheet in which the retroreflective layer has cube corner retroreflectors embossed on the backside thereof and covered by a predetermined pattern of hydrophobic silica. A backcoating contains the phosphorescent pigment and is in contact with the retroreflective layer in areas of the pattern not covered by the hydrophobic silica.

It is yet another object of the present invention to provide a photoluminescent reflective sheet which has a transparent flexible film with retroreflective cube corners formed on the reverse surface thereof and a clear adhesive with phosphorescent pigment screen-printed in a pattern and cured on the cube corners.

It is believed that the present invention may be utilized with retroreflector sheeting produced in a variety of ways but will be particularly useful with that retroreflective sheeting described and claimed in U.S. Pat. No. 4,618,518, issued Oct. 21, 1986, to Robert M. Pricone, et al. and assigned to applicants' assignee, the disclosure of which is incorporated by reference. Other forms and methods of producing retroreflective sheeting include those of "casting" cube corner elements, such as disclosed in Rowland U.S. Pat. Nos. 3,810,804, issued May 14, 1974; 3,684,348, issued Aug. 15, 1972; and 3,689,346, issued Sep. 15, 1972.

Useful apparatus for embossing a film to provide cube corner retroreflective elements is disclosed in Pricone, et al. U.S. Pat. No. 4,601,861, issued Jul. 22, 1986, commonly assigned. Other techniques for compression or sequential embossing are disclosed in Rowland U.S. Pat. No. 4,244,683, dated Jan. 13, 1981.

Efforts have been made in the past to utilize fluorescent pigmented materials in conjunction with retroreflective sheet materials of the cube corner type. However, such use of fluorescent materials was intended to provide a combination of day/night visibility in highway signs. One example is that found in Rowland U.S. Pat. No. 3,830,682, issued Aug. 20, 1974. However, in such uses, unlike phosphors, the flourescent material would not continue to glow or provide light under "darkened" conditions but instead is illuminated by the light of certain wave lengths, so as to provide some "daylight" visibility to highway signs.

The present invention utilizes a phosphorescent pigmentation in conjunction with retroreflective sheet material in a manner which does not materially impede the retroreflective capability of the sign when illuminated either under normal lighting conditions, such as in a building and under hallway lighting lights, nor does it impede the "dark" or night light retroreflective capability when illuminated by a flashlight or other temporary light source.

SUMMARY OF THE INVENTION

The present invention relates to a photoluminescent retroreflective sheeting material, which, in one embodiment, comprises a first layer of transparent retroreflective film having a front face and a plurality of cube corner retroreflective elements formed on at least a portion of the reverse or rear face to retroreflect light impinging upon the front face; a second layer of clear adhesive is screen-printed in a pattern and cured on the formed cube corner elements; a third layer of opaque film is adhered to the second layer to form air cells; an adhesive fourth layer is applied to the third layer for attaching the sheet material to a substrate surface; and a release liner is normally secured to the adhesive layer to prevent inadvertent contact of the adhesive layer with a surface. A phosphorescent pigment is contained in at least one of the first, second, third or fourth layers to cause the sheet to glow in the dark.

In a second embodiment the second layer is comprised of hydrophobic silica which eliminates the "air cell".

In a third embodiment, a thermoplastic film is attached to the reverse side of the transparent retroreflective film by heat sealing or sonic welding. This second film can be photoluminescent film which has secured to it a separate white adhesive layer, or can be comprised of two layers, a photoluminescent layer and an opaque white layer, followed by an adhesive layer. Other embodiments are disclosed.

BRIEF DESCRIPTION OF THE DRAWINGS

These and other objects of the present invention will be more fully understood when taken in conjunction with the following detailed description and the attached drawings in which like numerals represent like elements and in which:

FIG. 1 is a first embodiment that illustrates a cross sectional view of photoluminescent retroreflective sheeting of the present invention in which clear adhesive with a phosphorescent pigment is screen printed in a pattern on the retroreflective cube corners formed on the rear surface of a transparent film;

FIG. 2 is a cross-sectional view of a second embodiment of the present invention in which the retroreflective layer of film has the cube corners embossed on the rear surface thereof and a hydrophobic silica pattern is applied on the embossed surfaces; a backcoating with phosphorescent pigment is applied over the hydrophobic silica and is in contact with the otherwise exposed retroreflective cube corner elements;

FIG. 3 is a cross-sectional view of a third embodiment of the present invention in which the retroreflective layer has the cube corner reflectors on one side thereof and which layer also contains the phosphorescent pigment for enabling the sheet to be seen when not illuminated by an external source. An adhesive layer is applied over the hydrophobic silica layer and exposed cube corner elements, and a release liner is added to prevent accidental contact of the adhesive with a substrate surface;

FIG. 4 is a cross-sectional view of yet another embodiment of the present invention, in which the retroreflective layer contains the phosphorescent pigment; the hydrophobic silica is screened in a pattern over the embossed cube corner retroreflectors on the retroreflective layer; a white backcoating is applied to the silica layer and to the exposed cube corner elements, an adhesive layer is added and a release liner is applied to prevent the adhesive from accidentally touching a surface;

FIG. 5 is a schematic drawing of a process for making one embodiment of the present invention;

FIG. 6 is a schematic drawing of the process for making the invention illustrated in FIG. 2 of the present invention;

FIG. 7 is a schematic drawing of the process for making the embodiment of FIG. 3 of the drawings;

DETAILED DESCRIPTION OF THE DRAWINGS

Figure 8:
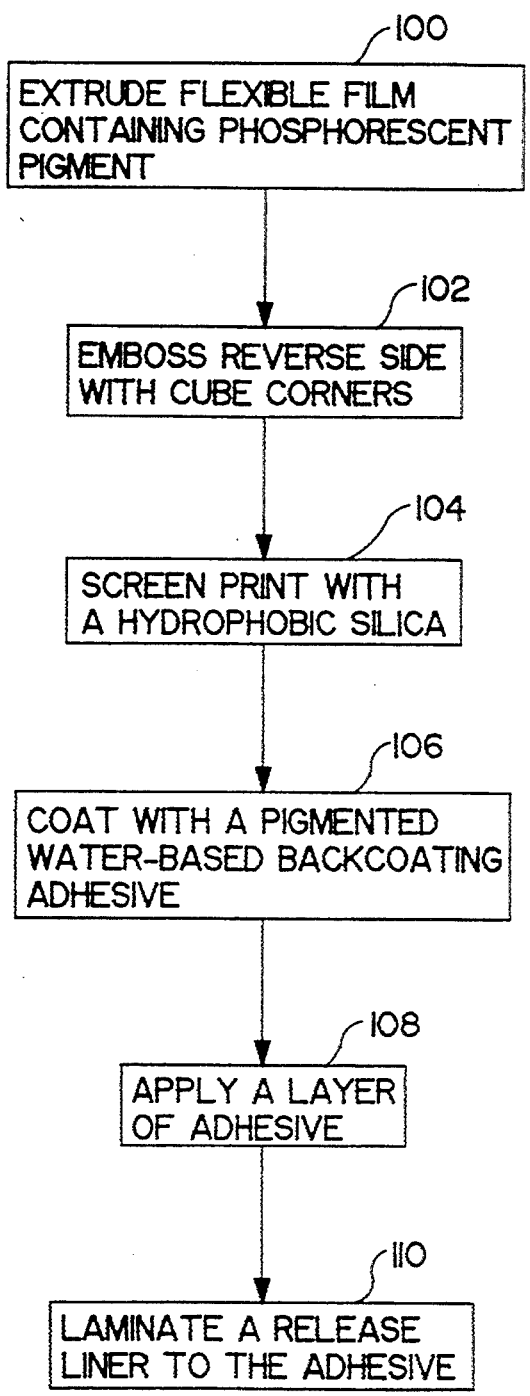
FIG. 8 is a schematic drawing of the process for making the photoluminescent retroreflective sheeting of the FIG. 4 embodiment.

A preferred embodiment of the present photoluminescent retroreflective sheeting is illustrated in cross-section in FIG. 1. The sheet comprises a first layer of transparent retroreflective film 12 that is formed generally in accordance with the method and apparatus disclosed in the aforesaid Pricone U.S. Pat. No. 4,486,363. However, as noted, other methods of forming a film with cube corner retroreflector elements (or spherical retroreflectors) may be used.

In the preferred form, the film 12 is approximately 0.006–0.008 inches thick and has a plurality of retroreflective corner cube elements 13 embossed on the rear side thereof.

It also has a layer of clear adhesive 14 containing a phosphorescent pigment screened in a pre-selected pattern over certain of the cube corner elements 13 so as to leave spaces or cells 22. One such adhesive 14 may be that known as Flexcryl 1625, sold by Air Products, Inc., and applied by screen printing. This is a water based acryclic.

The adhesive 14 contains a phosphorescent pigment which may be of a type known as P-1000, sold by Hanovia, a division of Conrad, Inc. of Newark, N.J. and which is commercially available. Other phosphorescent pigments may be used. The pigment may be batch mixed with the adhesive so as to constitute about 30% by weight thereof.

Other adhesives that may prove satisfactory would be drawn from unpigmented acrylics; urethanes; UV curable 100% solids; the criteria being that the adhesive bond between the resin layer and back layer be flexible and be readily applied.

The transparent retroreflective film 12 with the clear adhesive 14 and containing the phosphorescent pigment therein is then cured by heating or, if appropriate, and if UV curable, then curing can be accelerated.

After curing, an opaque layer of material 16, (such as polyester, PVC, or Mylar), is then applied over the transparent clear adhesive 14 with the phosphorescent pigment, to complete the "air" cells 22. The air cells permit retroreflectivity to be achieved, as is known in the art. Preferably, this layer 16 will be of a white color to enhance the brightness of the phosphorescent effect, but other colors or metallized films may be used.

An adhesive fourth layer 18 then may be applied to the white layer 16, enabling the sheeting material to be attached to a surface. A release liner 20 is applied to the adhesive layer 18 to prevent inadvertent contact of the adhesive with a surface until the user is ready to install the sheeting.

In the embodiment of FIG. 1, the retroreflective cells 22 allow the transparent film 12 to be retroreflective and reflect light impinging upon the front surface. The clear adhesive 14 with the phosphorescent pigment allows the strip to glow in the dark so that it can be followed by an individual. Thus, such sheeting can be used to form guidance systems that mark exits, doorways, hazards and the like in the case of a power outage. When the photoluminescent property of the sheets fail then the retroreflective cube corner elements will continue to retroreflect incident light, such as from a flashlight or the like carried by service individuals such as police, fire or utility department officials.

In FIG. 2, the sheeting 24 could be formed of a retroreflective layer of transparent flexible film 26 with cube corner retroreflective elements 27 formed on the reverse side thereof by embossing, to reflect incident light thereon. A hydrophobic silica layer 28 is screen printed in a pattern over the cube corner retroreflective cells 27. A clear water-based backcoating 30 is then placed over the hydrophobic silica 28. The backcoating contains the phosphorescent pigment. A white pigment adhesive 32 is laminated to the backcoating 30 for attaching the sheet to a surface. White pigment is used to enhance reflectivity as well as brightness of the phosphorescent material. A release liner 34 is laminated to the adhesive to prevent the adhesive 32 from inadvertently contacting a surface until the user is ready.

In the embodiment illustrated in FIG. 3, the retroreflective layer 38 also includes the phosphorescent pigment therein. The hydrophobic silica 42 is then screened on the cube corners 40 in a predetermined pattern and a white pigmented adhesive 44 is coated over the hydrophobic silica pattern. Again, a release liner 46 is laminated to the adhesive 44 to prevent the sheet from inadvertently sticking to a surface until the user is ready for it.

Other advantageous uses of the present invention with respect to retroreflective sheeting of other kinds, such as metallizing over some or all of the reflector elements, also will be recognized. Thus, for example, retroreflective sheeting material is disclosed and Martin U.S. Pat. No. 4,801,193 may be provided with the phosphorescent pigmentation advantageously employed in the present invention.

In the embodiment illustrated in FIG. 4, the sheet 48 is again formed of a transparent flexible film 50 that has retroreflective cube corner elements 52 formed on the reverse side thereof and which contains the phosphorescent pigment described earlier. Again, a hydrophobic silica 54 is screened on the cube corners of the translucent reflective flexible film 50 in a predetermined pattern. A white backcoating 56 as described earlier is coated over the hydrophobic silica 54. An adhesive layer 58 is laminated to the white backcoating 56 and a release liner 60 is laminated to the adhesive 58 to prevent the adhesive from inadvertently contacting a surface before the user desires.

The method of application and composition of the hydrophobic silica, backcoating and adhesive as discussed herein may be as disclosed in the aforesaid Pricone et al, U.S. Pat. No. 4,618,518.

A process for forming the photoluminescent retroreflective sheeting shown in FIG. 1 is illustrated in FIG. 5. The transparent flexible film may be extruded and have retroreflective cube corner elements embossed or cast on the reverse side thereof at step 64. At step 68, a clear adhesive containing a phosphorescent pigment is screen printed in a predetermined pattern on the cube corner elements on the reverse or rear side of the flexible film. At step 70, the adhesive is cured and at step 72 an opaque film, preferably white, is adhered to the adhesive to form air cells. At step 74, an adhesive layer is added to the film and at step 76 a release layer is laminated to the adhesive layer to prevent the adhesive from adhering to a surface prior to the time it is needed.

FIG. 6 illustrates the process steps for forming the invention of FIG. 2. Again, in step 1, the transparent flexible film is extruded. At step 80 retroreflective cube corners are formed on the reverse side by casting or embossing. At step 82, hydrophobic silica is screen printed in a pattern over the cube corner elements. At step 84, the silica is coated with a clear water-based backcoating containing the phosphorescent pigment. A white (or other color) pigmented adhesive is applied to the silica coating at step 86 and a release layer is laminated to the pigmented adhesive at step 88 to prevent the adhesive from inadvertently sticking to a surface.

FIG. 7 is a flow chart of the process for forming the photoluminescent retroreflective sheeting illustrated in FIG. 3. As can be seen in FIG. 7, the flexible film is extruded and contains the phosphorescent pigment which glows in the dark. The retroreflective cube corner elements are then embossed on the reverse side of the extruded flexible film at step 92. Hydrophobic silica is then screen printed on the cube corners in a predetermined pattern at step 94. A water-based backcoating adhesive is applied to the hydrophobic silica at step 96. Finally, a release liner is laminated to the adhesive at step 98 to prevent the product from sticking to a surface inadvertently.

The flow chart of FIG. 8 discloses the method of making the sheeting sample illustrated in FIG. 4. Again, at step 100, the flexible film containing the phosphorescent pigment is extruded. In step 102 the reverse side of the sheet is embossed with the cube corner elements. In step 104, the hydrophobic silica is coated with a pigmented water-based backcoating, preferably white. At step 108 the layer of adhesive is applied to the backcoating and in step 110 a release liner is laminated to the adhesive. Again, such liner is used to prevent the adhesive from inadvertently sticking to a surface before it is intended to be used.

Since the present film is primarily to be used indoors, additional overlays or other ultraviolet inhibitors which help prevent deterioration of outdoor retroreflective sheeting may not be necessary, further reducing the processing cost.

Figure 9:
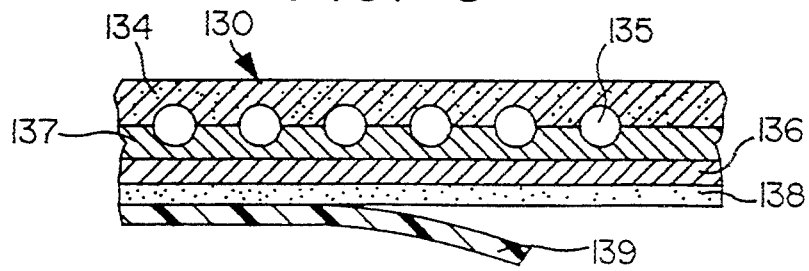
FIG. 9 is a cross-sectional view of another embodiment of the invention in which the phosphorescent pigment is utilized with "beaded sheeting" containing microspheres to provide retroreflectivity.

FIG. 9 discloses a sample microsphere beaded type sheet material 130 employing the present invention. The beaded sheeting 130 may be of the type produced by 3M Corporation and sold under the trademark Scotchlite ®. It is believed such material is made in accordance with various 3M patents such as U.S. Pat. Nos. 2,407,680 and 4,511,210. In this embodiment the sheeting comprises a layer of monosphere beads 135 and a transparent layer of resin below which may be a specially reflecting surface 136. The phosphorescent pigment 134 may be employed in an overlay over the beads, or in the binder layer 137 in which the beads are embedded. In the case of so-called high intensity beaded sheets, the phosphorescent pigment may be incorporated into the cell walls. A layer of adhesive 138 and a release liner 139 also may be used.

In the alternative embodiment illustrated in FIG. 10, the sheet 140 is again formed of a transparent flexible film 142 of thickness ranging from about 0.006 inches to about 0.008 inches that has retroreflective cube corner elements 144 formed on the reverse side thereof. This embodiment, however, contains a second, photoluminescent film 146 having thickness in the range of from about 0.010 to about 0.020 inches, which is attached to the reverse side of the transparent retroreflective sheet by heat sealing, sonic welding or other process known in the art. Preferably, the photoluminescent film 146 contains the photoluminescent pigment described above.

Figure 10:
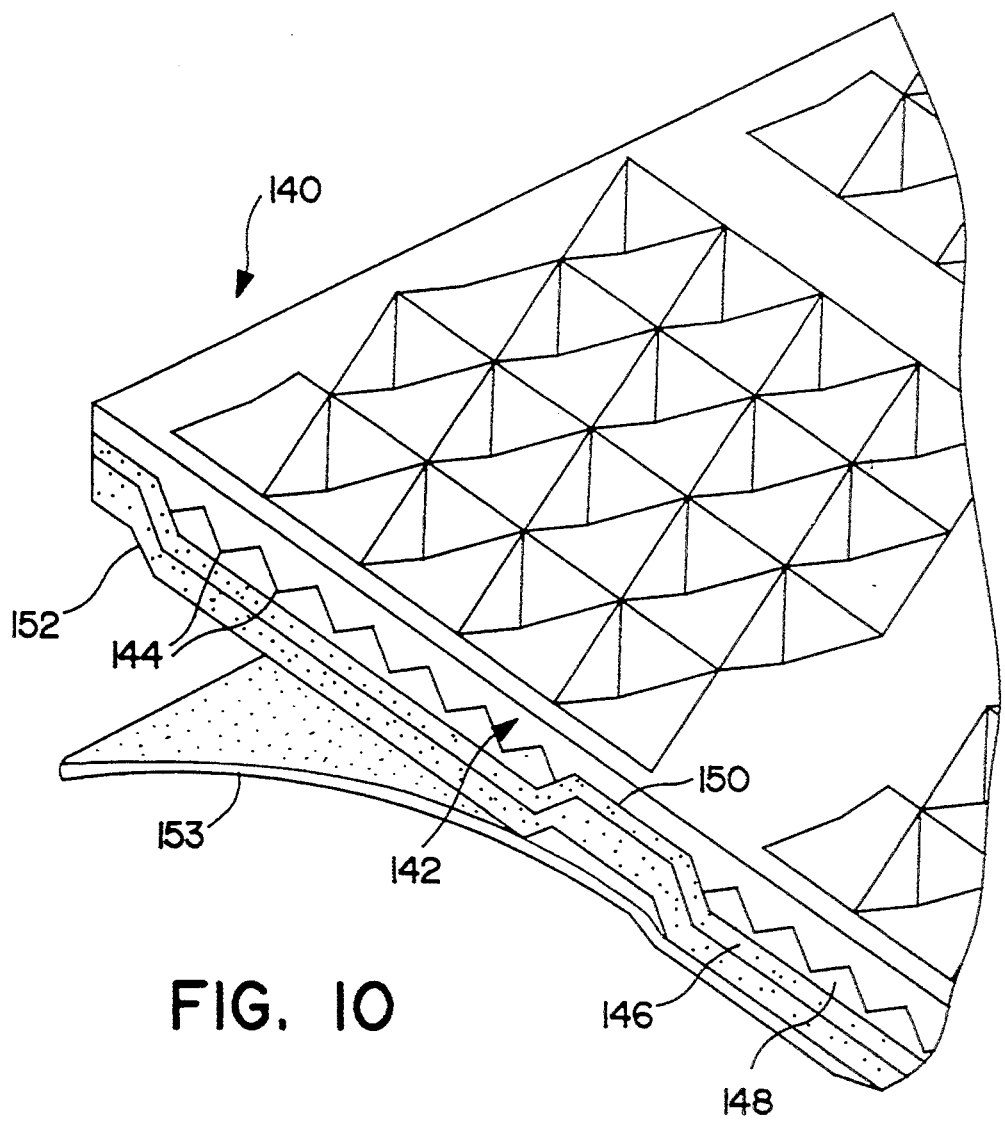
FIG. 10 is a cross-sectional view of yet another embodiment of the invention in which a phosphorescent film is attached to the reverse side of the transparent film.

The attachment of the photoluminescent film to the transparent film is according to a pre-selected pattern. Preferably, the pattern is created in the photoluminescent film at the time of heat sealing or sonic welding as shown in FIG. 10. Alternatively, the pattern can be created in the transparent film before attachment to the photoluminescent film by creation of a pattern in the embossing tool which forms the cube corner microprisms.

At least part of the photoluminescent film is spaced from the cube corner micro-prisms on the reverse side of the retroreflective sheet to form air cells 148 therebetween, thereby maintaining the retroreflective quality. There is no air between the retroreflective film and photoluminescent film at the points where the heat sealing or sonic welding 150 attachment has been made to the reverse side of the retroreflective layer. Moreover, the cube corners will be deformed or destroyed by the heat sealing and sonic welding processes.

The second, photoluminescent film has attached to its backside a white adhesive layer 152 which can be either laminated to or coated directly on the film. A release liner 153 covers the adhesive to prevent contact of the adhesive with any surface until the sheeting is to be applied. The release liner can be removed from the sheeting without removing the white adhesive, as is known in the art.

Figure 11:
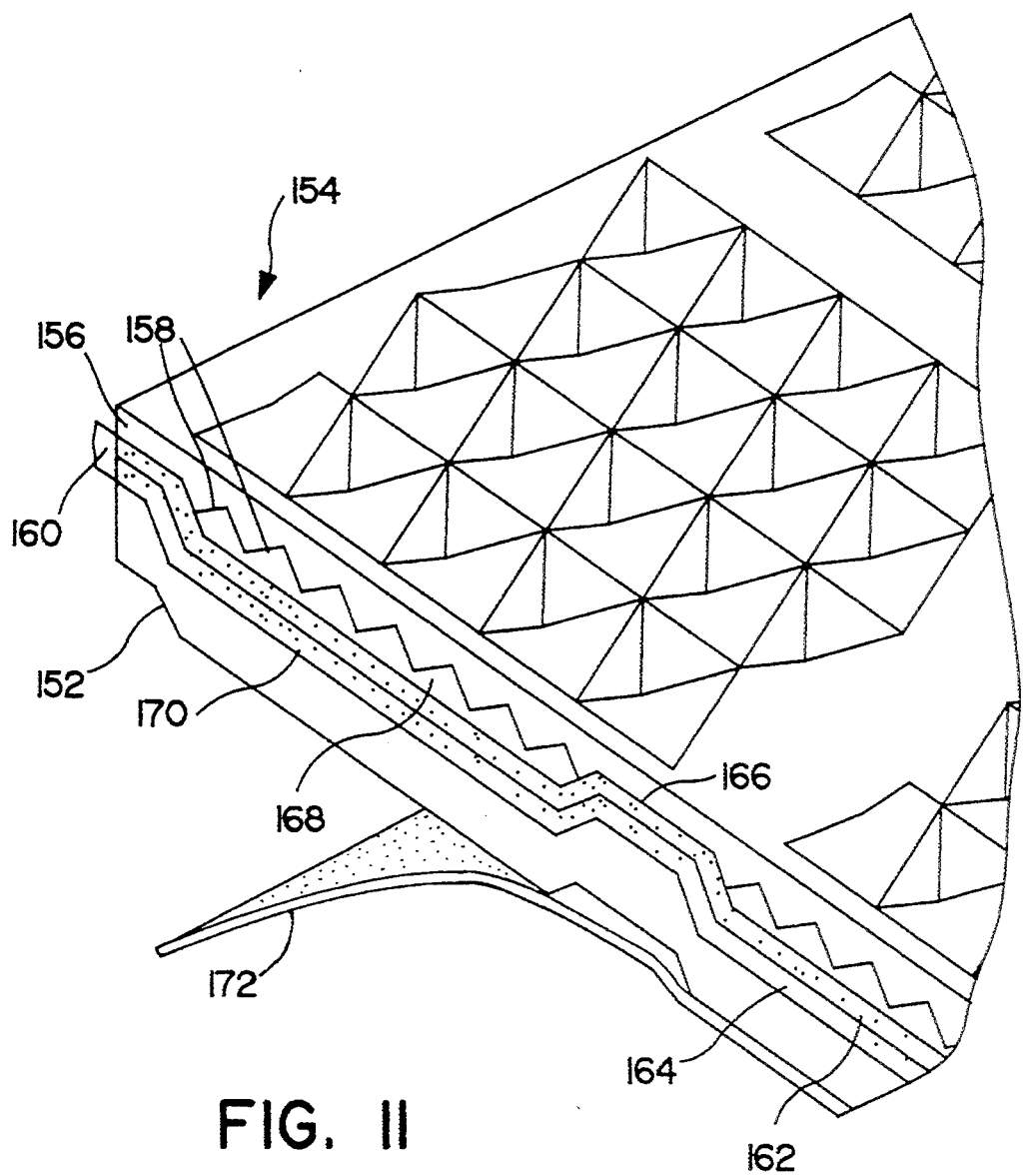
FIG. 11 is a cross-sectional view of a variation of the embodiment of the invention shown in FIG. 10, with second film having a top photoluminescent layer and lower opaque white layer.

FIG. 11 shows yet another alternative embodiment 154 of the inventive photoluminescent retroreflective sheeting. Again, this embodiment contains a transparent flexible film 156 of about 0.006 inches to about 0.008 inches in thickness, and has embossed on its reverse side a series of cube corner micro-prisms 158 producing the retroreflective characteristics discussed above.

The reverse side of the retroreflective film has attached to it a flexible thermoplastic film 160 composed of two distinct layers. The first layer 162 contains photoluminescent pigment and the second layer 164 is an opaque white layer. The thickness of this two layer film is in the range of from about 0.015 inches to about 0.030 inches. Such films are commercially available as "photoluminescent vinyl tape" sold by Hanovia of Newark, N.J. (as part of its Escape Route System), and as Lumilux ® sold by the Fine Chemicals Division of Hoechst Celanese, Charlotte, N.C.

This two layered second thermoplastic film is attached preferably in a pre-selected pattern to the cube corner containing reverse side of the retroreflective sheet by heat sealing, sonic welding or similar process known in the art 166. Alternatively, the pattern can be created in the transparent retroreflective sheet before heat sealing or sonic welding to the second film. The second film is spaced from the retroreflective microprisms where it is not heat sealed, sonic welded or otherwise attached, to form air cells 168 therebetween. The retroreflective quality of the top sheet is preserved where the air cells have been created.

An adhesive layer 170 is either laminated to or coated directly on the second two-layer film. The adhesive has a release liner 172 reversibly attached to its reverse side. The release liner prevents inadvertent contact of the adhesive with any surface until the sheeting is to be applied. The release liner 172 may be removed from the sheet without removing or otherwise staying attached to the adhesive of the adhesive layer 170.

Figure 12:
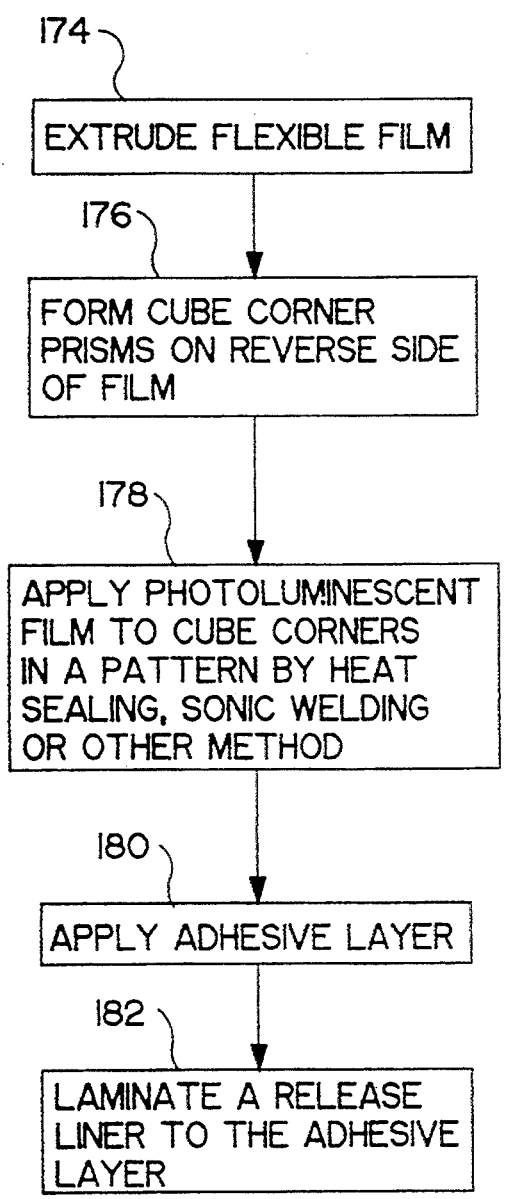
FIG. 12 is a schematic drawing of the process of making the photoluminescent retroreflective sheeting embodiments shown in FIG. 10 and FIG. 11.

FIG. 12 shows a schematic drawing of the process of making the embodiments shown in FIGS. 10 and 11. The initial step, shown at the top of FIG. 12, is the extrusion of a flexible transparent film 174 having thickness of approximately 0.006 inches to about 0.008 inches. After this film is extruded, cube corner prisms or micro-prisms are formed 176 on its reverse side, preferably by embossing. The formation of the cube corner prisms or micro-prisms transforms the transparent material into a retroreflective sheet capable of reflecting incident light.

The extrusion of the flexible film and the formation of the cube corners on its reverse side is followed by application of the second film 178 which contains the photoluminescent pigment. This film is attached in a pre-selected pattern to the reverse side of the first, retroreflective sheet through heat sealing, sonic welding or other similar means. The photoluminescent film is spaced from the cube corner micro-prisms on the reverse side of the retroreflective sheet, except where it is attached by heat sealing or sonic welding. This photoluminescent film is about 0.010 inches to about 0.020 inches in thickness and has attached to its reverse side in the next process step 180 a white adhesive layer. This adhesive layer is capable of attaching the sheeting to a desired surface.

A release liner is applied to the adhesive layer in the following step 182 to prevent contact of the adhesive with any surface until the sheeting is desired to be applied. The release liner may be removed from the adhesive layer without removing the adhesive layer, leaving the adhesive intact so that it will be present when the sheeting comes into contact with the desired application surface.

The above-described process will result in the sheet illustrated in FIG. 10. A variation of this process will result in the embodiment shown in FIG. 11. This variation is made by the process described above except for steps 178 and 180. For step 178 a second, thermoplastic film which has a thickness of approximately 0.015 inches to about 0.030 inches is applied instead of the photoluminescent film described for step 178 above. This second film contains a top photoluminescent first layer containing a photoluminescent pigment, followed by a second, white opaque layer. Because of the presence of the opaque white layer in the second film applied in step 178, the adhesive layer applied in step 180 need not be white. All the remaining details of the process steps to produce the embodiment of FIG. 11 are the same as described above to produce the embodiment in FIG. 10.

It will be appreciated from the foregoing that the present invention provides significant advantages for safety purposes in that dual functions can be obtained while utilizing sheeting having a high degree of retroreflectivity and photoluminescence while minimizing the amount of material required for each such purpose.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A phosphorescent retroreflective laminate sheet construction comprising:

a transparent film having a front face and a reverse face, and having cube corner retroreflectors formed on the reverse face thereof for retroreflecting light incident on the front face of the film;

a phosphorescent film attached to the reverse face of the transparent film in a pre-selected pattern, such that at least parts of the phosphorescent film are spaced from the transparent film to form air cells therebetween, said phosphorescence being visible from the front face of said transparent film; and a white adhesive applied to the phosphorescent film for attaching the laminate Sheet construction to a surface.

2. The sheet construction of claim 1, further comprising a release liner attached to the adhesive to prevent inadvertent contact of adhesive with another surface.

3. The sheet construction of claim 1, wherein the phosphorescent film is attached to the transparent film by a process selected from the group consisting of heat sealing and sonic welding.

4. The sheet construction of claim 1, wherein the phosphorescent film is from about 0.010 inches to about 0.020 inches thick.

5. A phosphorescent retroreflective laminate sheet construction comprising:
   a transparent film having a front face and a reverse face, and having cube corner retroreflectors embossed on the reverse face thereof for retroreflecting light incident on the front face of the film;
   a phosphorescent film of thickness of from about 0.010 inches to about 0.020 inches, attached by a process selected from the group consisting of heat sealing and sonic welding to the reverse face of the transparent film in a preselected pattern, such that the phosphorescent film is at least partially spaced from the transparent film to form air cells therebetween, said phosphorescence being visible from the front face of said transparent film;
   a white adhesive applied to the phosphorescent film for attaching the sheet construction to a surface; and,
   a release liner attached to the adhesive to prevent inadvertent contact of the adhesive with a surface.

6. A phosphorescent retroreflective laminate sheet construction comprising:
   a transparent film having a front face and a reverse face, and having cube corner retroreflectors formed on the reverse face thereof for retroreflecting light incident on the front face of the film;
   a second film attached to the reverse face of the transparent film in a pre-selected pattern, such that at least parts of the second film are spaced from the transparent film to form air cells therebetween, the second film comprising a first layer containing a phosphorescent pigment and a second layer that is white, said phosphorescence being visible from the front face of the transparent film; and,
   an adhesive applied to the second film for attaching the sheet construction to a surface.

7. The sheet construction of claim 6 further comprising a release liner attached to the adhesive to prevent inadvertent contact of the adhesive with a surface.

8. The sheet construction of claim 6, wherein the second film is attached to the transparent film by a process selected from the group consisting of heat sealing and sonic welding.

9. The sheet construction of claim 6 wherein the second film is from about 0.015 inches to about 0.030 inches thick.

10. A phosphorescent retroreflective laminate sheet construction comprising:
   a transparent film having a front face and a reverse face, and having cube corner retroreflectors embossed on the reverse face thereof for retroreflecting light incident on the front face of the film;
   a flexible thermoplastic film from about 0.015 inches to about 0.030 inches thick attached to the reverse face of the transparent film in a pre-selected pattern by a process selected from the group consisting of heat sealing and sonic welding, such that at least parts of the thermoplastic film are spaced from the transparent film to form air cells therebetween, the thermoplastic film comprising a first layer containing a phosphorescent pigment and a second layer that is white, the phosphorescence being visible from the front face of said transparent film;
   an adhesive applied to the thermoplastic film for attaching the sheet construction to a surface; and,
   a release liner attached to the adhesive to prevent inadvertent contact of the adhesive with a surface.

* * * * *